United States Patent [19]
Nottingham et al.

[11] Patent Number: 6,018,438
[45] Date of Patent: Jan. 25, 2000

[54] PROTECTIVE MAGNET SHIELD FOR A SPINDLE MOTOR

[75] Inventors: Robert Alan Nottingham; Robert Michael Pelstring, both of Santa Cruz, Calif.

[73] Assignee: Seagate Technology, Inc., Scotts Valley, Calif.

[21] Appl. No.: 09/050,846

[22] Filed: Mar. 30, 1998

[51] Int. Cl.[7] ............................ G11B 17/02; H02K 23/00
[52] U.S. Cl. .................................. 360/98.07; 360/99.08; 310/156
[58] Field of Search ........................... 360/98.07, 99.04, 360/99.08; 310/67 R, 156

[56] References Cited

U.S. PATENT DOCUMENTS

| | | | |
|---|---|---|---|
| 4,564,777 | 1/1986 | Senoo et al. | 310/156 |
| 4,639,625 | 1/1987 | Abukawa et al. | 310/154 |
| 4,707,630 | 11/1987 | Tomite et al. | 310/154 |
| 5,590,003 | 12/1996 | Dunfield et al. | 360/98.07 |
| 5,783,890 | 7/1998 | Mulgrave | 310/156 |
| 5,877,916 | 3/1999 | Papst | 360/98.07 |

*Primary Examiner*—Jefferson Evans
*Attorney, Agent, or Firm*—Flehr Hohbach Test Albritton & Herbert LLP

[57] ABSTRACT

A simplified spindle motor assembly is disclosed, in which the need for scrap or rework of the motor as it is being assembled is reduced, and a protective shield for the magnet protects the magnet from bumping into the sharp edges of the stator when the sleeve of the motor which supports the magnet is being assembled into the base of the disc drive. In addition, the simplified device for aligning the magnet axially along the sleeve properly aligns the magnet axially with the stator which is separately supported from the base when the sleeve and shaft are assembled into the base.

5 Claims, 5 Drawing Sheets

PROTECTIVE MAGNET SHIELD FOR A SPINDLE MOTOR

FIELD OF THE INVENTION

The present invention is directed generally to a spindle motor for use in a disc drive and more particularly to a sub assembly for protecting the magnet during assembly of the motor.

BACKGROUND OF THE INVENTION

In magnetic disc drives, reduction of the cost of manufacturing and assembly, as well as reliability of all components, is a constant goal. The spindle motor which supports one or more discs for rotation at constant speed is one of the most expensive and complex parts of the disc drive. Therefore, substantial attention is paid to steps which will make manufacturing and assembly of the spindle motor simpler, while minimizing the cost of assembly and the need for any rework.

A typical spindle motor is shown in FIG. 1, and includes a sleeve 1 supporting a hub 2 which in turn supports one or more discs 3 for constant speed rotation about a shaft 4. In this motor as well as in many other motor designs, a magnet 5 is supported axially below hub 2 on an extended portion 6 of the sleeve 1 which serves as a back iron, and immediately adjacent a stator 7. Activation of the spindle motor windings establishes a field which interacts with the magnet 5 to cause rotation of the rotor and the hub 2.

Obviously, the magnet 5 will have to be placed close to the stator 7 to optimize the interaction between these parts as well as to minimize the size of the motor. However, frequently when the sleeve and magnet are inserted into the base 8, the magnet 5 bumps into the edges of the stator laminations 9; these are metal, may have sharp edges, and could cause scratching or scaring of the soft material which forms the magnet 15. The resulting discontinuities in the magnet surface could reduce the efficiency of the motor if left alone, as well as causing magnetic particle contamination that can cause drive failure. Fixing the scars would require disassembling the sleeve 1 and shaft 4 from the base 8, and replacing the magnet structure.

Further, it can be seen that to optimize the interaction between the magnet 16 and the stator, the magnet should be properly axially aligned with the stator. This requires accurate fixturing of the magnet 5 relative to the sleeve 1 when the two are assembled.

SUMMARY OF THE INVENTION

Therefore, a general objective of the present invention is to provide a spindle motor in which the assembly is simplified, and the need for rework of the motor as it is being assembled is reduced.

A related objective of the invention is to provide a protective shield for the magnet which protects the magnet from bumping into the sharp edges of the stator when the sleeve of the motor which supports the magnet is being assembled into the base of the disc drive. Further, with testing of the motor, the insertion of the sleeve and shaft combination into a base or test jig may occur as many as six times before the motor is finally assembled. With each insertion, contact of the magnet with the stator is at risk.

A related objective of the invention is to provide a simplified device for aligning the magnet axially along the sleeve, so that when the sleeve and shaft are assembled into the base, the magnet will be properly axially aligned with the stator which is separately supported from the base.

These and other objectives of the invention are achieved by providing a protective shield having a radial portion which extends along the base of the sleeve and against which the base of the magnet also rests so that the magnet is always properly aligned with respect to the sleeve. The protective shield, which is generally L-shaped, also includes an axial portion which is of a dimension to be press fit against the inner surface of the sleeve. Thus in assembling the spindle motor, the protective shield may be pressed into place against the inner surface of the sleeve, and the magnet is then aligned with the bottom of the sleeve by pushing it against the radial segment of the protective shield. When the assembly of the sleeve and magnet is complete, they can be inserted into the motor with the shield protecting the magnet from contact with the stator and preventing any damaging scars to the magnet.

Other features and advantages of the invention will become apparent to a person of skill in the art who studies the following invention disclosure of a preferred embodiment given with respect to the following drawings.

DETAILED DESCRIPTION OF A PREFERRED EMBODIMENT

Figure 1:
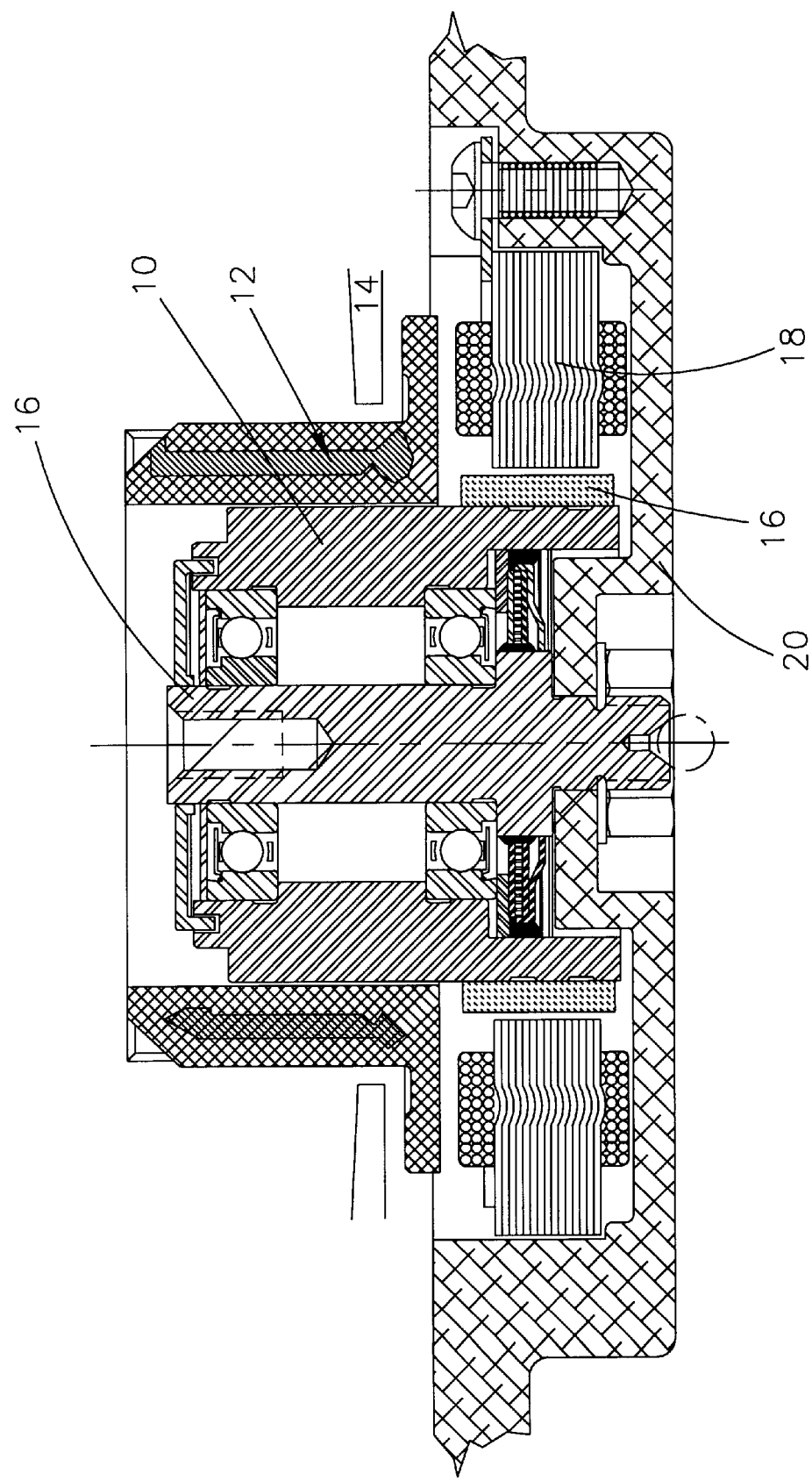
FIG. 1 is a horizontal sectional view of a spindle motor which the present invention is useful.
Figure 2:
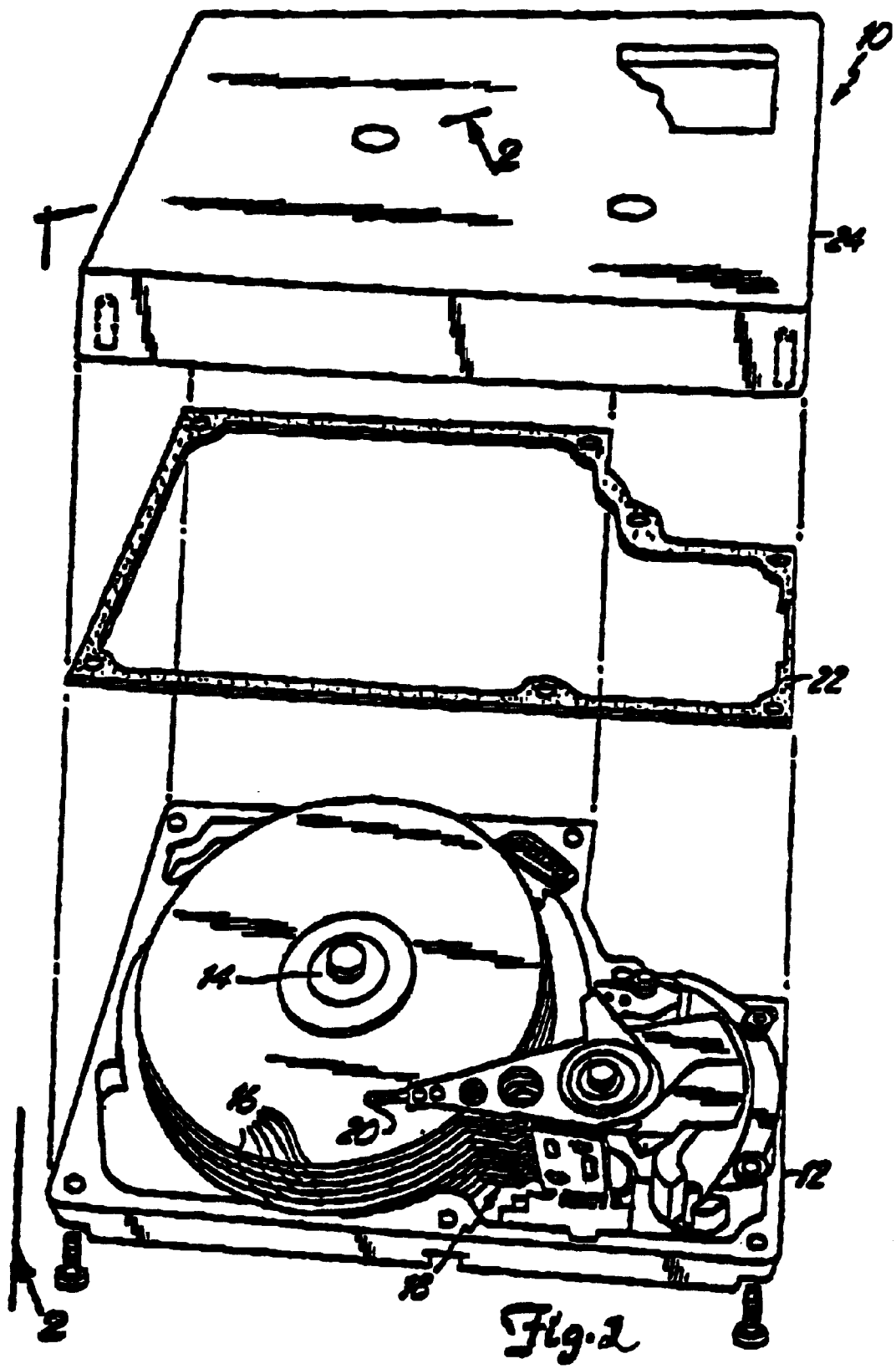
FIG. 2 is an exploded view of a disc drive in which the present invention is useful.

FIG. 2 is an exploded perspective view of a magnetic disc drive storage system in which the present spindle motor would be useful. The protective magnet shield of this invention is not limited to use with a particular spindle motor such as was shown in FIG. 1, nor is it useful only in motors used in disc drives. However, the design requirements of spindle motors used in disc drives make the use of this invention especially desirable in this environment. In the example of FIG. 2, the storage system 10 includes a housing base 12 having a spindle motor 14 which rotatably carries storage discs 16. An armature assembly 18 moves transducers 20 across the surface of the discs 16. The environment of discs 16 is sealed by seal 22 and cover 24. In operation, the discs 16 are rotated at a constant high speed by the spindle motor, while the transducers 20 are positioned at any one of a plurality of radially differentiated tracks on the surface of the discs. This allows the transducers to read and write magnetically encoded information on the surface of the discs at selected locations.

Figure 3A:
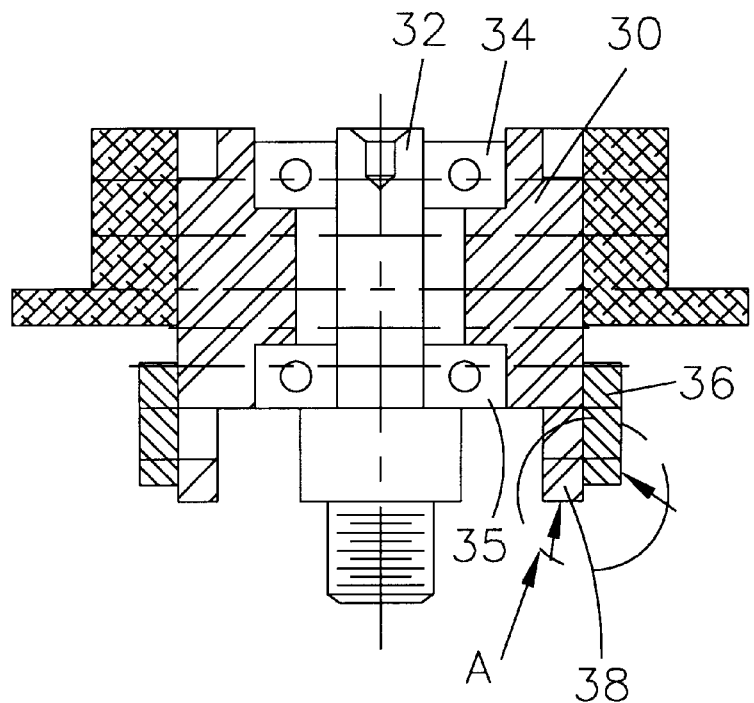
FIGS. 3A, 3B and 3C are schematic views of a motor showing a motor design according to the prior art, and the modifications to be made to incorporate the present invention therein.
Figure 3B:
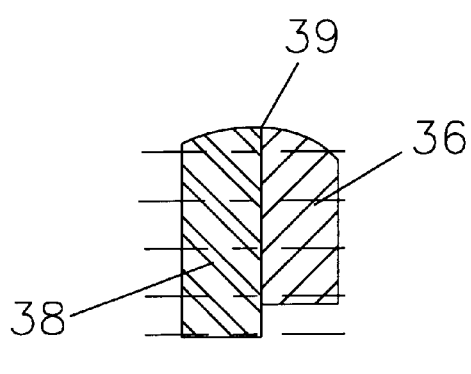
Figure 3C:
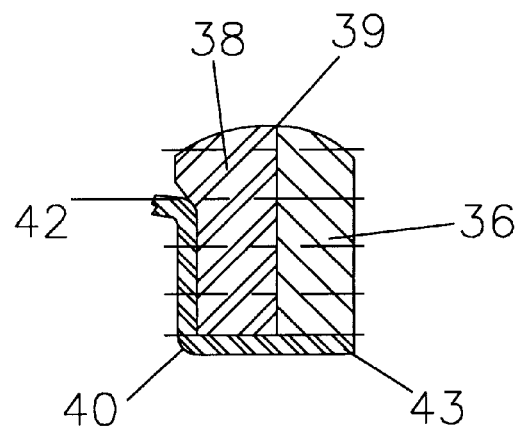

A vertical sectional view of a typical spindle motor used in this environment has already been shown in FIG. 1. FIG. 3A is a schematic view of such a typical spindle motor, including a sleeve 30 supported for rotation about the shaft 32 by bearings 34, 35. The magnet 36 is supported on an outer surface of the sleeve 30 which extends below hub 37; this axially extended portion 38 of sleeve 30 serves as a backiron for the magnet. The detail marked A in FIG. 3A is shown in expanded form in FIGS. 3B and 3C. In FIG. 3B, the backiron 38 and magnet 36 are shown in their positional relationship as achieved in the prior art. As previously discussed, the two pieces must be held in this position in a fixture while a layer of adhesive 39 between the two layers cures to hold the magnet firmly in place. As discussed above, if the magnet is bumped against the laminations of the stator, frequently the entire hub and shaft need to be removed from the base, and replaced. Therefore, according to the present invention, an L-shaped protective magnet shield 40 is provided as shown in FIG. 3C. Preferably, the shield is pressed or pushed into place on a reduced diameter region 42 of the backiron 38. After the shield is pushed in place, the magnet 36 is axially aligned with the radial portion 43 of the shield 40. The adhesive 39 can then be allowed to cure. Now when the rotor, sleeve, hub and shaft assembly is inserted into the base of a motor or disc drive as shown in FIG. 1, the shield 40 protects the magnet 36 from contact with the stator laminations 9 so that no chipping or scratching of the magnet occurs. Thus the need for scrap or rework of the spindle motor once the shield is used is substantially reduced or eliminated.

Figure 4:
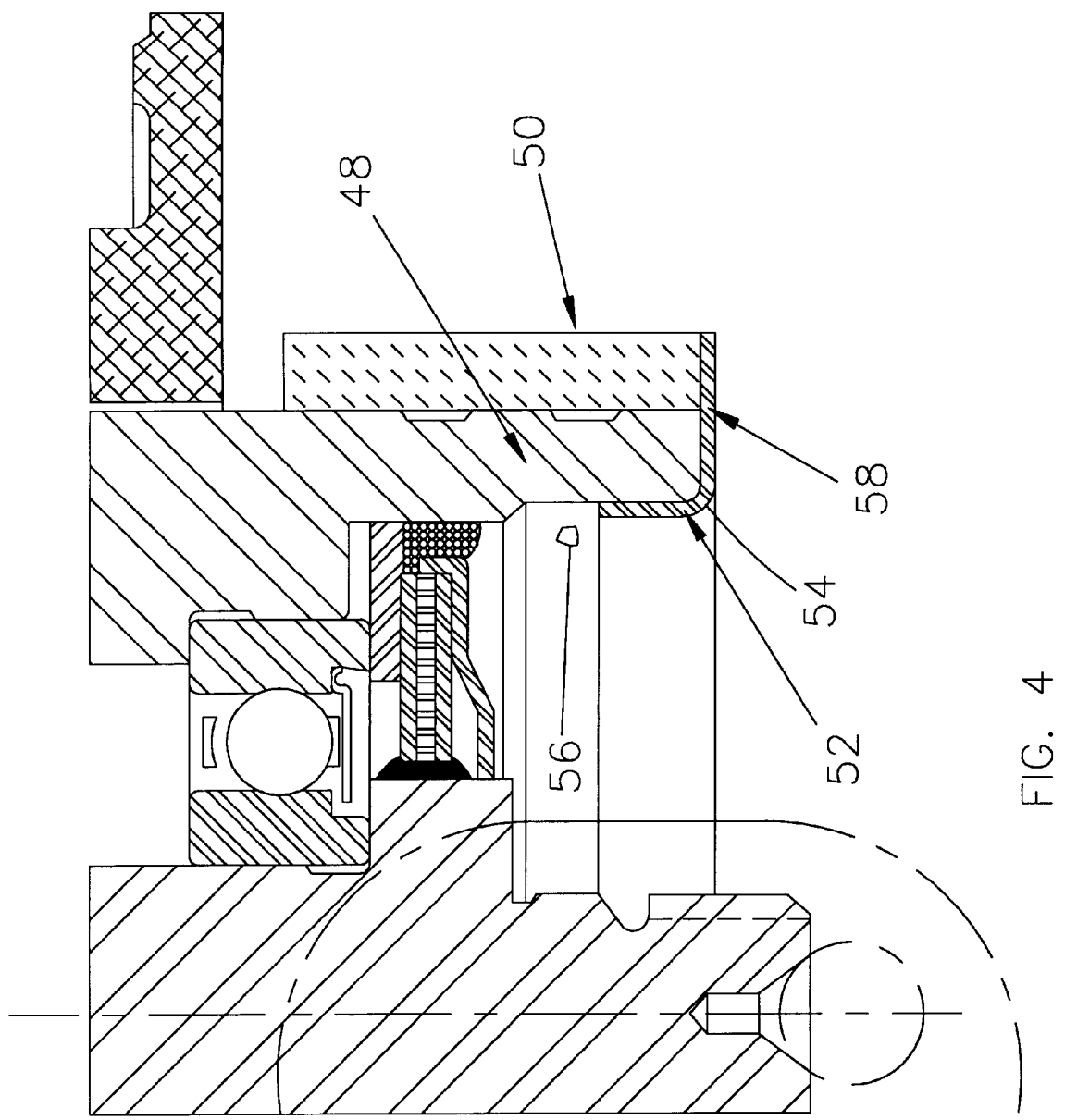
FIG. 4 is a magnified view of a portion of the motor of FIG. 1, showing the sleeve as modified to accept the protective magnetic shield and with the shield and magnet in place.

FIG. 4 is an expanded view of the salient portions of the motor of FIG. 1, including the backiron 48, supporting the magnet 50. As can be seen, the axial portion 52 of the shield 54 is pressed in place in the recess 56 of the backiron. The radial portion 58 of the shield provides the axial alignment for the magnet relative to the backiron 48.

A comparison of FIG. 4 with FIG. 1 shows how the shield 58 protects the magnet 50 from contact with the stator laminations. It should further be noted that the provision of a recess 56 is not required to use this invention. The recess is provided so that the internal dimensions of the sleeve/backiron 48 do not have to be modified to incorporate this invention.

The shield itself can be made of many non-magnetic materials as is well known in this field. The shield could also be fabricated in many different ways, machined, stamped, molded, . . . .

Figure 5A:
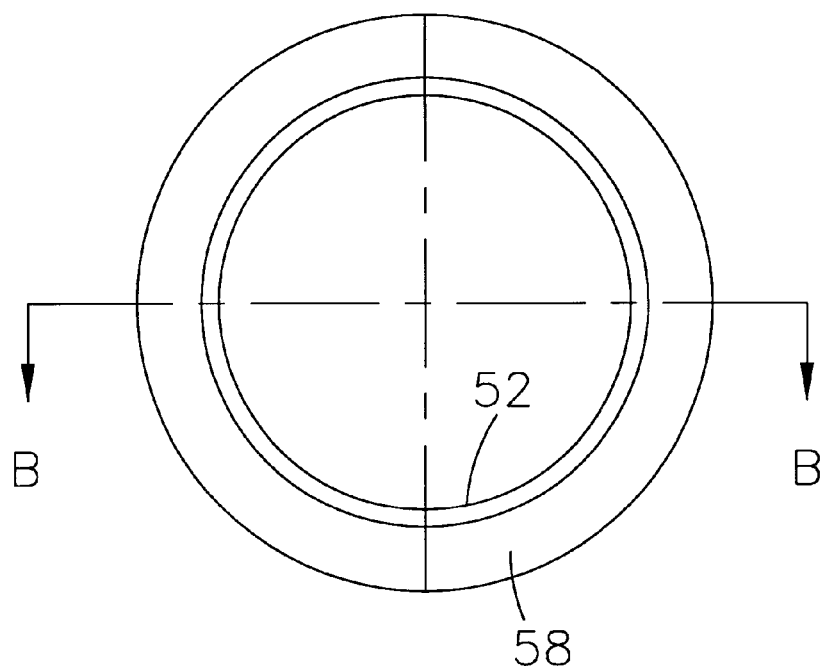
FIGS. 5A and 5B show the protective shield standing alone.
Figure 5B:
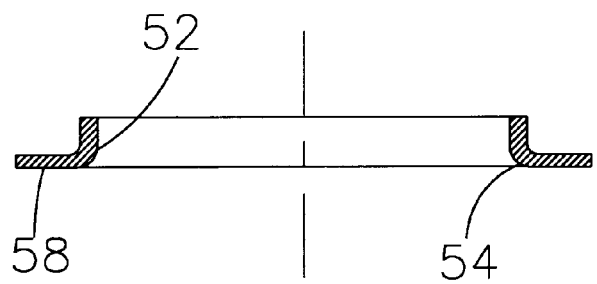

FIGS. 5A and 5B show the protective shield standing alone. The same reference numerals have been used in FIGS. 5A and 5B as in FIG. 4 to indicate the radial portion 58 and axial portion 52 of the shield 54.

Other features and advantages of the present invention will become apparent to a person of skill in the art who studies the present invention disclosure. Therefore, the scope of the present invention is to be limited only by the following claims.

What is claimed is:

1. An improved spindle motor comprising a shaft, a sleeve mounted for rotation about the shaft by bearings, a hub supported on said sleeve, and a magnet supported on said outer surface of said sleeve axially spaced from said hub, said magnet being mounted primarily on a narrow portion of said sleeve which serves as a backiron for said magnet, and an L-shaped protective magnet shield having a axial portion pressed against an inner surface of said backiron and a radial portion extending below said sleeve and said magnet so that said protective shield protects said magnet from contact with stator laminations of said spindle motor when said sleeve and magnet are moved relative to said stator laminations.

2. A spindle motor as claimed in claim 1 further comprising a base, said shaft being mounted in said base, and said stator being mounted from an extended portion of said base adjacent said magnet.

3. A spindle motor as claimed in claim 2 wherein said magnet rests against said radial portion of said protective shield so that said magnet is axially aligned relative to said backiron and said stator laminations by said protective shield.

4. A spindle motor as claimed in claim 3 wherein said backiron includes a recess extending along a radially inner surface of said axial portion of said protective shield, being pressed against said inner surface in said recess.

5. An improved spindle motor comprising a shaft, a sleeve mounted for rotation about the shaft by bearings, a hub supported on said sleeve, and a magnet supported on said outer surface of said sleeve axially spaced from said hub, said magnet being mounted primarily on a narrow portion of said sleeve which serves as a backiron for said magnet, and shield means supported from said backiron and positioned for protecting said magnet from contact with stator laminations of said spindle motor.

* * * * *